Dec. 20, 1960 R. R. BATCHER 2,965,811

CIRCUIT SELECTOR DEVICE

Filed Aug. 8, 1957 4 Sheets-Sheet 1

Inventor
Ralph R. Batcher
John Todd
Attorney

Dec. 20, 1960

R. R. BATCHER 2,965,811

CIRCUIT SELECTOR DEVICE

Filed Aug. 8, 1957

4 Sheets-Sheet 2

Inventor
Ralph R. Batcher
John Todd
Attorney

Dec. 20, 1960 R. R. BATCHER 2,965,811

CIRCUIT SELECTOR DEVICE

Filed Aug. 8, 1957 4 Sheets-Sheet 3

Inventor
Ralph R. Batcher
John Todd
Attorney

Dec. 20, 1960 R. R. BATCHER 2,965,811

CIRCUIT SELECTOR DEVICE

Filed Aug. 8, 1957 4 Sheets-Sheet 4

Inventor
Ralph R. Batcher
John Todd
Attorney

United States Patent Office 2,965,811

Patented Dec. 20, 1960

2,965,811

CIRCUIT SELECTOR DEVICE

Ralph R. Batcher, 240—02 42nd Ave., Douglaston, N.Y.

Filed Aug. 8, 1957, Ser. No. 677,082

15 Claims. (Cl. 317—99)

Figures 1, 2:
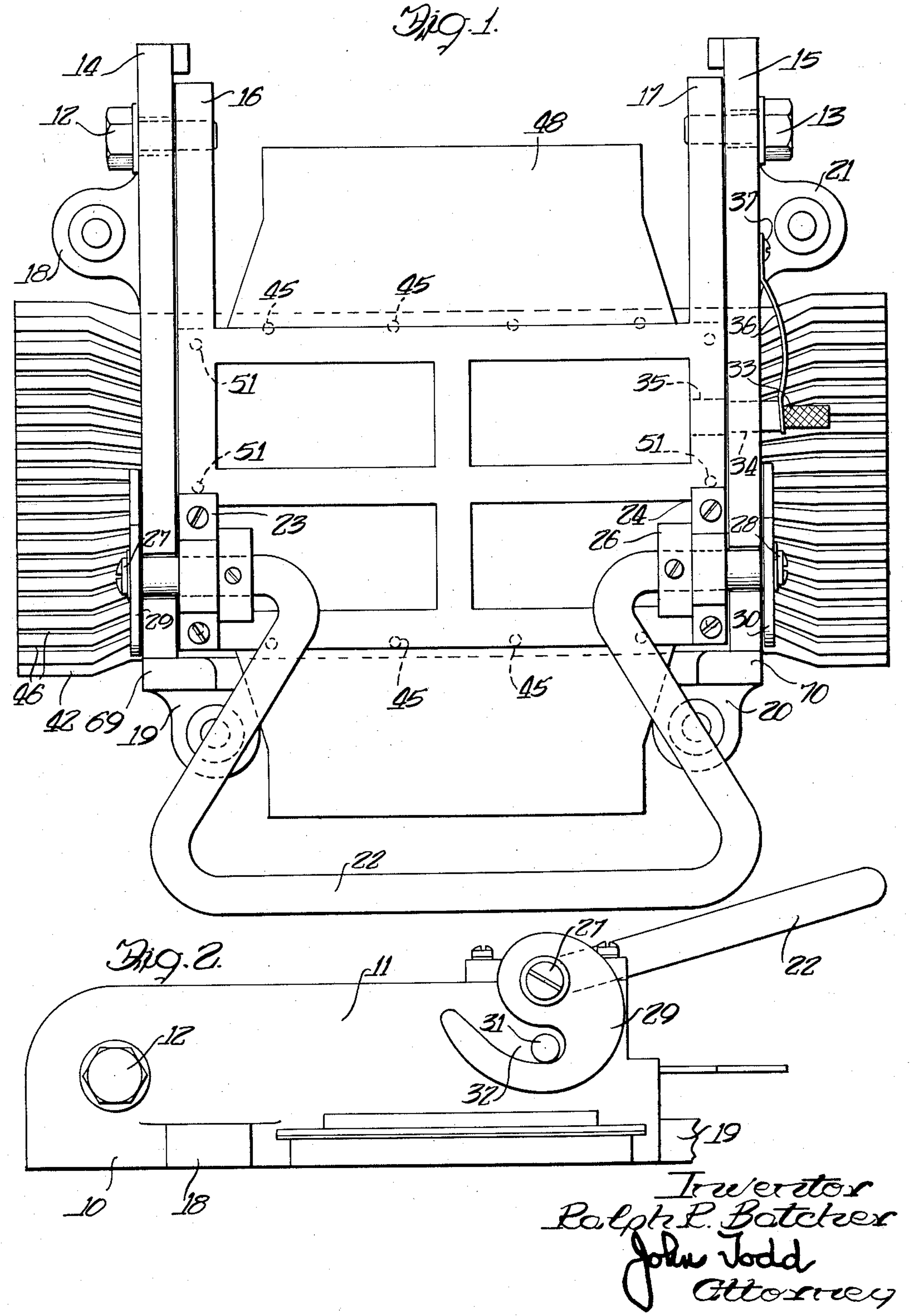

This invention relates to a circuit selector device, and is more particularly concerned with a device for selectively connecting one or more of a plurality of conductors comprising a part of one circuit network to one or more of a plurality of conductors comprising a part of another circuit network. The device is especially useful in environments wherein change is required from time to time in the interconnection of a plurality of circuits as, for example, in tube testers, telemetering networks, etc., and is especially suited for use with printed wire circuits.

The common switch is an example of a circuit selector device, and a single-throw, single-pole switch may be used to connect one circuit with another and is a completely satisfactory device when used to accomplish that result. Similarly, multiple contact switches may be employed to connect one circuit with one of several other circuits which are attached to the respective contacts thereof. In more complicated circuitry where it is necessary to connect one circuit to one or more of a plurality of circuits, or in certain instances to connect each of a plurality of circuits to one or more of another group of circuits, a patchcord system is used except where permanency in the interconnections is desired.

As is well known, patchcord programming systems are employed for they afford change when necessary in the circuit interconnections, and they comprise a universal switching arrangement usable, as a result, in various environments. However, they are complex from the point of view of the number of connector wires required, are bulky and are unsightly. Further, there is considerable likelihood of error in their use in that each patchcord must have the ends thereof connected manually in the appropriate sockets. Thus, reliance must be made on the human element.

Accordingly, an improved circuit selector and connector arrangement is needed, and the provision thereof is one of the objects of this invention. Still another object is to provide a circuit selector device that utilizes the advantages of printed circuits and affords interconnection of circuit networks by establishing contact between printed wires which comprise integral parts thereof. Still another object is that of providing a universal circuit selector device that employs a coded card insert as the selector medium, whereby the opportunity for error usually inherent in selector systems is obviated.

Yet another object is to provide a device of the character described, wherein a large predetermined number of circuit interconnections are possible, and in which one or more of such interconnections are established through an aperture-coded card interposed in the device so as to afford electrical contact between the chosen circuits through the apertures thereof. A further object is that of providing a device that opens and closes to afford placement of a coded card therein, and wherein provision is made to guard against accidental closure thereof, whereby circuit interconnection results only when intended by a workman. Additional objects and advantages will become apparent as the specification develops.

An embodiment of the invention is illustrated in the accompanying drawings, in which—

Figures 3, 4, 5, 6, 7:
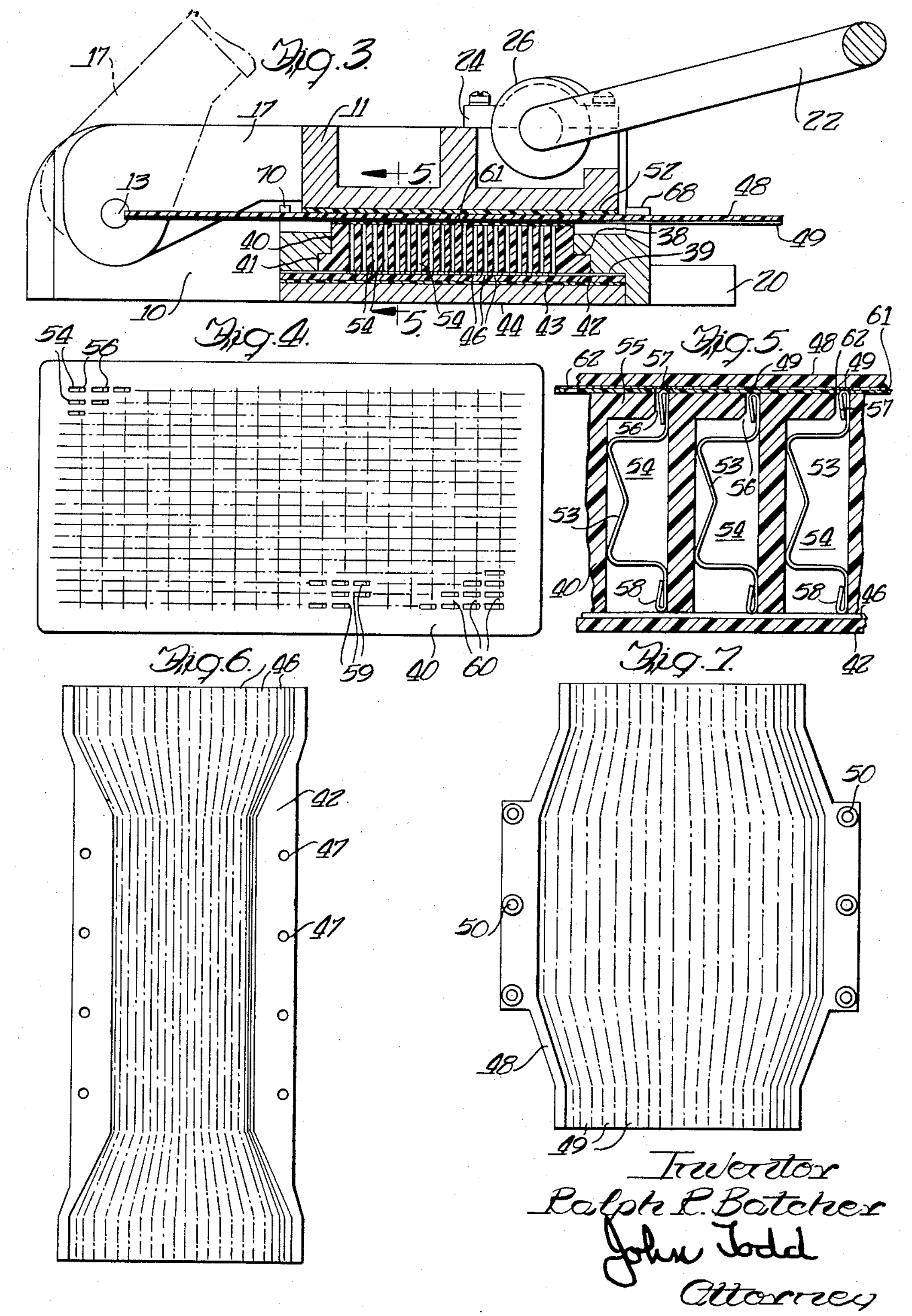
Figures 8, 9:
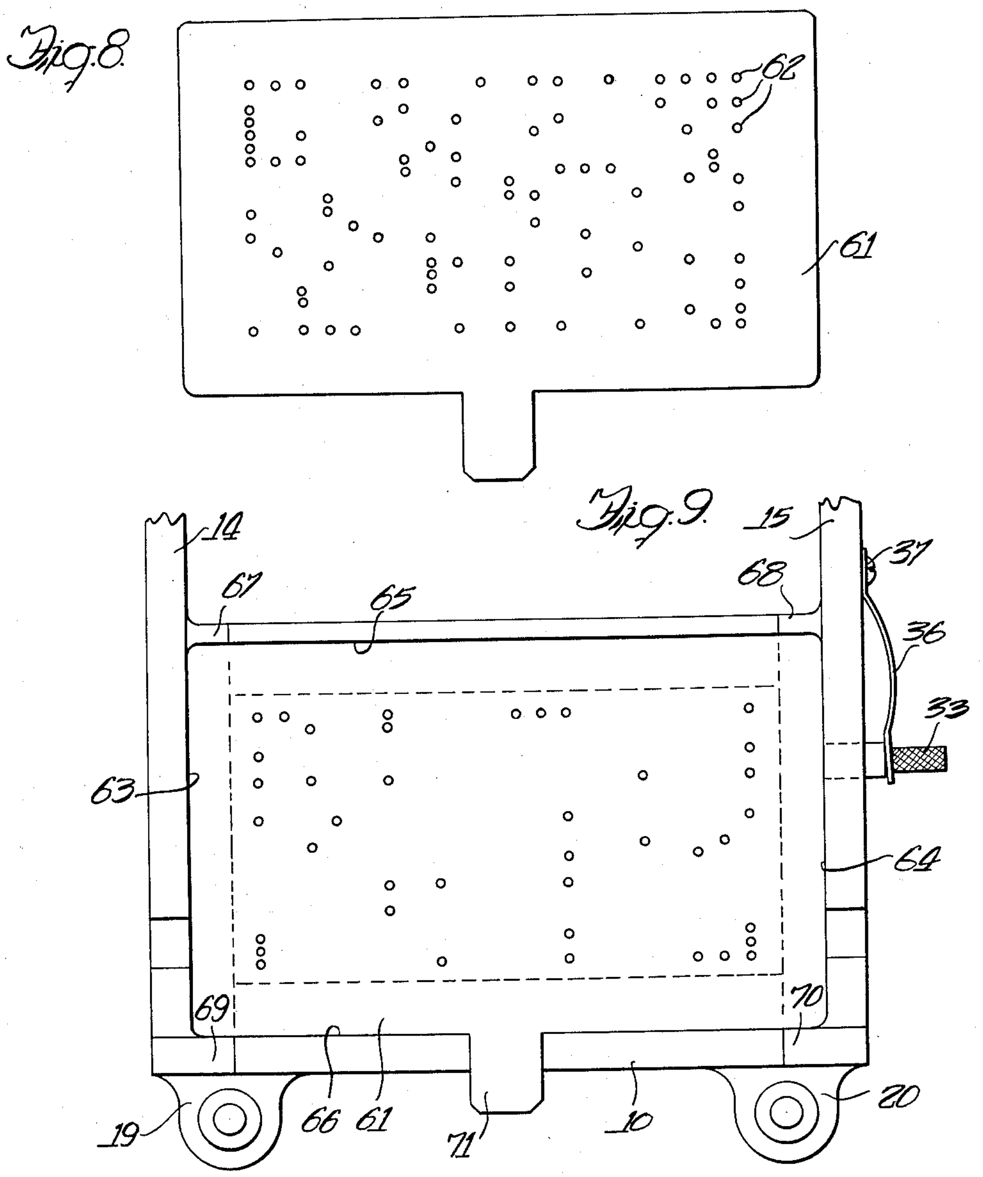
Figure 10:
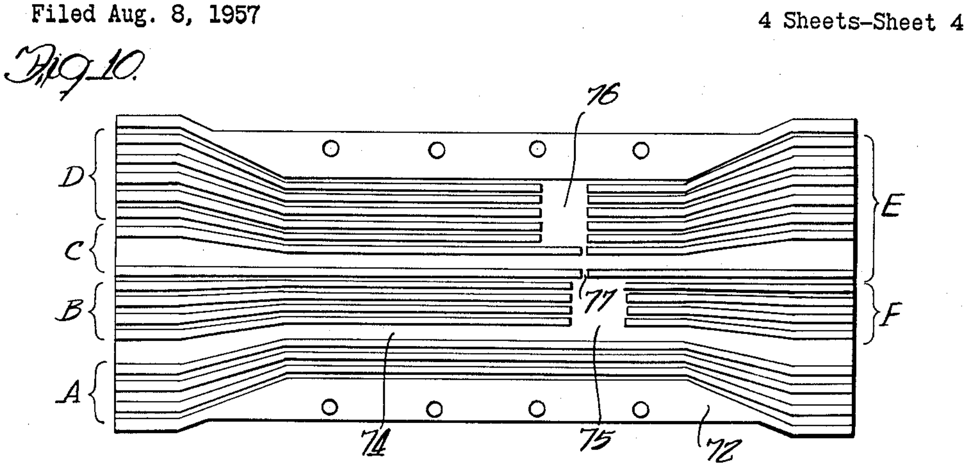
Figures 11, 12:
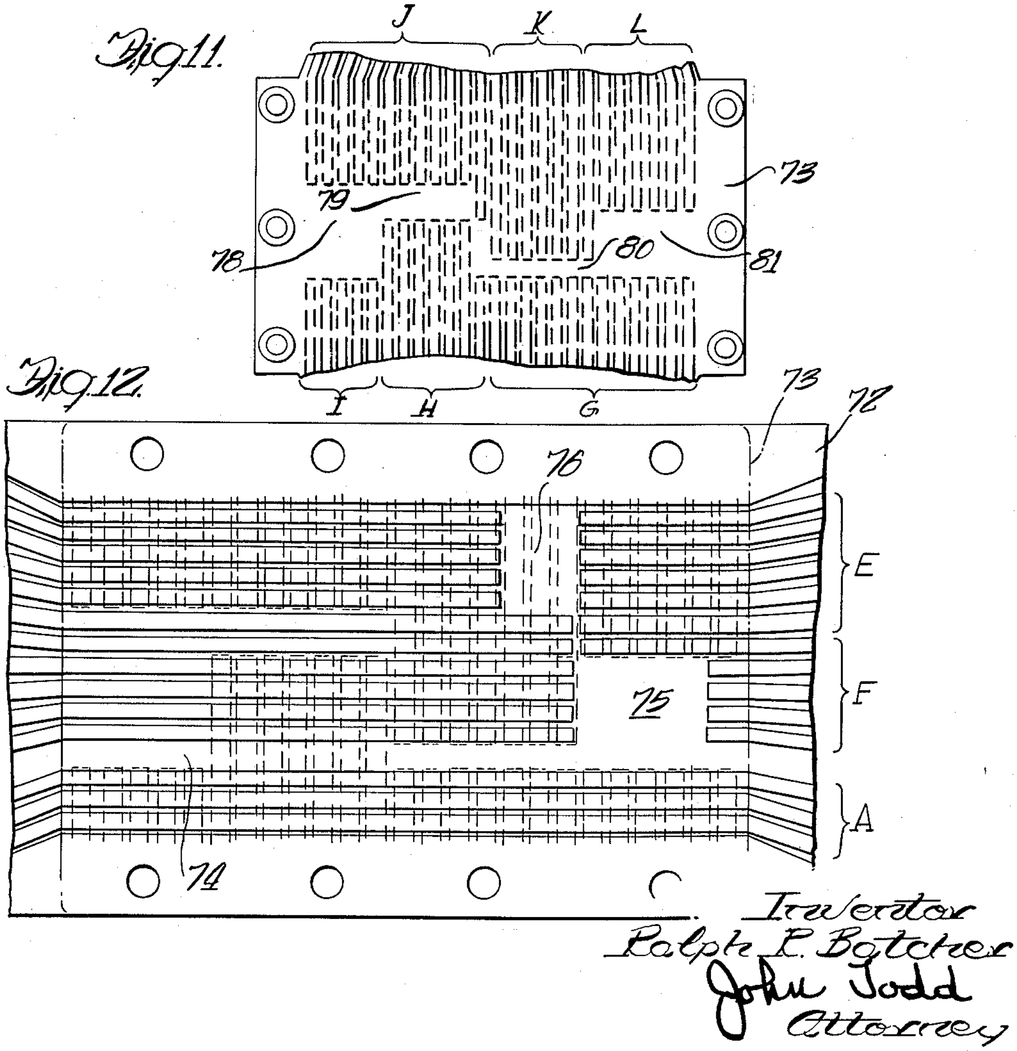

Figure 1 is a top plan view of a selector device embodying the invention; Figure 2 is a side view in elevation of the device; Figure 3 is a longitudinal sectional view taken generally along the center line of the device; Figure 4 is a top plan view of the contactor terminal block; Figure 5 is a vertical sectional view taken along the line 5—5 of Figure 3; Figure 6 is a top plan view of the lower or bottom printed wire panel used in the device; Figure 7 is a top plan view of the other or upper printed wire panel; Figure 8 is a top plan view of a punch-coded card that may be used with the apparatus; Figure 9 is a broken top plan view of the lower frame having a punched card mounted therein; Figure 10 is a top plan view of a modified form of the lower printed wire panel illustrated in Figure 6; Figure 11 is a broken top plan view of a modified form of the upper printed wire panel shown in Figure 7; and Figure 12 is a somewhat diagrammatic view showing the upper panel of Figure 11 superimposed on the panel of Figure 10, to illustrate the circuit connections which would be made therebetween in the absence of an intervening punch-coded card.

As is seen most clearly in Figures 1 and 3, the device comprises a lower frame member 10, and an upper frame member 11 supported for opening and closing movement with respect to the lower frame on pivot pins 12 and 13 that are threadedly secured in the respective legs 14 and 15 of the lower frame and pivotally carry the spaced legs 16 and 17 of the upper frame. The open position of the upper frame member is illustrated in part by the broken lines in Figure 3. The lower frame 10 carries a plurality of outwardly extending mounting ears 18 through 21, each of which is apertured so as to permit a mounting screw to be threaded therethrough.

At its forward end, the upper frame 11 provides a pivotal mounting for a latch handle 22 of generally U-shaped configuration, having laterally turned ends pivotally supported by the respective bearing clamps 23 and 24 and held against lateral movement with respect thereto by the stop collars 25 and 26. The laterally turned ends of the latch handle have threaded bores therein for receiving the cap screws 27 and 28 that are used to rigidly secure the respective cam latches 29 and 30 thereto. Rotation of the cam latches with respect to the handle is prevented by squaring the end portions of the handle, and by providing corresponding square-shaped openings in the cam latches for receiving the same therein.

The lower frame 10 is provided on each side with a latch pin 31 that is receivable within the cam slot 32 provided in each of the latches 29 and 30. Thus, the upper frame member can be brought into facing closure with the lower frame member by swinging the cam latches into engagement with the latch pins upon downward movement of the handle 22 into the position illustrated best in Figure 2. Reverse movement of the handle frees the latch pins from the cam slots 32, thereby permitting the upper frame member to be swung open about the pivotal axis defined by the pins 12 and 13.

Desirably, means are incorporated in the structure to prevent inadvertent closure of the upper frame 11, and such means may take the form of a safety pin 33 (as shown in Figures 1 and 9) having a knurled outer end and an elongated stem slidably movable through an opening 34 provided therefor in the leg 15 of the lower frame—such opening terminating in a groove 35 along which the pin is slidable. Ordinarily, the pin 33 is biased inwardly by a leaf spring 36 bifurcated at its free end to receive the pin 33, and secured at its other end by a screw 37 to the leg 15 of the lower frame. Thus, when the upper frame is swung toward closed position, its movement is terminated by abutment with the pin 33 unless that pin is moved outwardly against the biasing force of the leaf spring to provide clearance for closure, and the pin will be held in an outward position by a coded card, as will be described hereinafter.

Figure 3 illustrates that the lower frame 10 has an opening therein formed in stages, one of which is defined by an inwardly extending perimetric shoulder 38, and the other being defined by a similar shoulder 39 extending inwardly but being spaced outwardly of the shoulder 38 and therebelow. Mounted within the opening in the lower frame is a contact or terminal block 40 made of non-conducting material, and having an outwardly extending perimetric flange 41 adapted to seat against the shoulder 38. Mounted against the block 40 along the underside thereof is a printed wire panel or board 42 that may have positioned along its underside a sheet of insulating material 43. The panel 42 substantially seats against the shoulder 39 of the lower casting, and the block 40, panel and insulating sheet are held in place by a backing plate 44 secured to the frame by means of cap screws 45 (Figure 1).

The panel 42 is shown in plan in Figure 6, and it is there apparent that it is equipped along one side thereof with a plurality of printed wires 46 extending longitudinally thereof in substantially parallel relation. These printed wires are also shown in Figure 3 which is taken along a line extending transversely through the panel 42. Further, the panel is provided with a plurality of openings 47 therethrough that receive the mounting screws 45 which secure the backing plate 44 to the lower frame. In the specific embodiment of the invention illustrated, the sheet of insulating material 43 may be removed for it is unnecessary in that the panel 42 has printed wires 46 along but one side thereof. However, it should be included in the event that the panel has printed wires running along each side, for the frame members 10 and 11 as well as the backing plate 44 are all metal (anodized die-cast aluminum) and, therefore, electrical conductors.

Secured to the upper frame 11 is a printed wire panel 48 having (as is clearest from Figure 7) a plurality of printed wires 49 on one side thereof extending in substantially parallel relation from end to end of the panel. The longitudinal edges of the panel 48 are flanged outwardly to provide spaced openings 50 adapted to have cap screws 51 extended therethrough (Figure 1) to secure the panel to the upper frame. The openings 50 have countersunk faces along one side of the panel so as to permit the heads of the screws 51 to be recessed therein. A sheet 52 of insulating material is interposed between the metal surface of the upper frame 11 and the printed wire panel 48, although this is not necessary in the form of the invention shown for the panel 48 has printed wires only on the underside thereof. It will be noted in both Figures 1 and 3 that the printed wire panels 42 and 48 are oriented so that the printed wires thereof extend transversely to each other, or at substantially right angles.

The requirement is to afford selective interconnection between the wires 46 of the lower printed wire panel and the wires 49 of the upper panel, and such interconnection is provided through the spring contacts or terminals 53 (shown in Figure 5, but omitted from the illustration of Figure 3 for purpose of clarity). The contacts 53 are mounted within channels or passages 54 extending from top to bottom in the contact block 40. The specific block, as shown in Figure 4, has four hundred passages 54 therein arranged in both longitudinally and transversely extending rows—there being twenty of each. Thus, since there is a contact member 53 in each passage, four hundred of these elements are provided. Also then, the panel

42 has twenty printed wires thereon, as does the panel 48. The precise number of printed wires and contact members in any specific structure will depend upon the capacity requirement therefor. Thus, there may be more or less than four hundred passages and contacts, and it is envisioned that the device will permit incorporation of one or more blocks of contacts so that it more readily can be tailored to meet the requirements of any given installation.

The passages 54 are enlarged throughout substantially the entire length thereof, and are open at one end so as to permit the insertion of the contacts 53 thereinto. At the other end, the passages terminate in a closure wall 55 that is effective to prevent the respective contacts from falling completely through the passage. Each wall 55 has a restricted passageway 56 therein dimensioned to slidably receive the end 57 of a contact 53. In length, the contacts 53 are slightly longer than the thickness of the block 40 so that the end 57 and the end 58 of each contact will project outwardly therefrom. However, the contact members are resilient and compressible—or, more specifically, spring-like—so that the ends 57 and 58 may be moved toward each other but are under constant bias that tends to spread them apart.

When the structure is assembled as shown in Figures 3 and 5, the lower ends 58 of the contact members are in engagement with the printed wires 46 on the panel 42. Thus, since there are twenty rows of contacts 53 extending in parallel alignment with the printed wires 46 of the panel 42, each printed wire thereon will have the ends of twenty contact members in engagement therewith. The rows that extend at right angles thereto are aligned with the printed wires 49 on the upper panel 48, and as a result each of those wires is adapted to engage the twenty contacts in alignment therewith. For purposes of identification, the lower panel 42 may be thought of as extending longitudinally of the device, and the rows of contact members aligned with the printed wires thereof may be denoted with the numeral 59. The panel 48 then by contrast extends transversely of the device, and the rows of contact members aligned with the printed wires thereof are designated with the numeral 60 for identification.

Selection of the contacts 53 which will be permitted to engage the wires 49 on the upper panel 48 is afforded through the coded card 61 which may have any number of punched out or apertured portions 62 therein. Where the card is apertured, the upper ends 57 of the contacts 53 can extend therethrough and into engagement with the printed wires 49 on the upper panel 48. As shown in Figure 5, the two outer contacts 53 there illustrated extend through apertures 62 in the card and into engagement with the wires of the upper panel. However, the central contact 53 cannot engage the printed wire disposed thereabove because the card is imperforate at the portion thereof aligned with the contact.

It will be appreciated that each printed wire of the lower panel 42 may be connected with one or more of the printed wires of the upper panel, or any number of the lower printed wires 46 may be connected to any desired number of the upper printed wires, simply through appropriate coding or punching of the cards 61. Thus, a number of cards can be provided—each distinctly coded to permit interconnection of the wires or circuits represented thereby. Positive positioning of the cards 61 with respect to the block 40 may be accomplished in any suitable manner; and in the specific structure herein considered, the card 61 is dimensioned longitudinally and transversely so that the ends 63 and 64 thereof abut the respective legs 14 and 15 of the lower frame 10, while the end portions of the edges 65 and 66 abut alignment or stop members 67 and 68, and 69 and 70, respectively. For convenience, the card 61 may be equipped with a tab 71 to facilitate handling of the card during insertion and removal thereof. The spring contacts 53 being compressible, complete closure of the frame members is permitted, for the closing movement simply brings about compression of the contacts at the imperforate areas of the card 61. A slight compression will also take place in each of the contact members to assure good electrical connection thereof with the respective printed wires.

In use of the device, the handle 22 is pivoted in a counter-clockwise direction as viewed in Figure 2, to release the latch pins 31 and permit the upper frame 11 to be swung open. A coded card 61 is then positioned on the block 40; and in inserting the card 61, the pin 33 will first be drawn outwardly or, if the card is flexible, it may be bowed slightly along its length so that the edge 64 will clear the inner end of the pin 33. When the card is released, it will return to its flat, planar position, pushing the pin 33 outwardly.

The upper frame 11 is then pivoted downwardly or in a clockwise direction, as seen in Figure 2, to bring the frame sections into facing relation. Latching or fastening of the frame sections together to bring the contacts 53 into good electrical connection with the printed wires is effected by swinging the handle 22 downwardly to cam the upper frame section closed through engagement of the cam passage 32 in each cam latch with the latch pins 31. This simple procedure assures proper interconnection of the desired circuits. As brought out before, when the card 61 is removed, the pin 33 projects inwardly of the frame leg 15 which prevents closing of the upper frame since the leg 17 thereof will then abut the inner end of the pin.

The ends of the panels 42 and 48, and more particularly the ends of the printed wires thereon, will be connected to suitable circuits (not shown) through any appropriate connecting means as, for example, printed wire panel end connector strips now commercially available and well known. Thus, in use of the device, the printed wires comprise integral parts of the circuits of the network with which the device is employed. If, for example, the arrangement is employed in a tube tester, a coded card 61 will be provided for each type of tube; and to test a tube, it will only be necessary to insert it into a socket therefor and to place the coded card for such tube in the circuit selector device. Apart from the necessity of proper card choice, there is no chance for error in establishing the correct circuits for testing any given tube because the operator does not have to read charts, set a number of switches, etc. during the tube testing operation.

It is apparent from the foregoing description that the configuration of the printed wires on each of the printed wire panels determines a basic interconnection system which can be modified by the use of punch-coded cards. Since it is difficult to forecast what type of interconnection system might be required at some future time, the selector device is made more versatile by permitting change of one or both of the printed wire panels, and the use of commercial end connectors as described facilitates such interchangeability. Thus, printed wire panels can be provided wherein the conductors have various configurations, and consequently, numerous basic interconnection systems can be employed, each of which may be further modified by use of punch-coded cards.

The printed wire panels shown in Figures 10 and 11 comprise a conductor configuration which affords a basic interconnection system that differs sharply from that provided by the panels of Figures 6 and 7. It will be noted that dimensionally the panels 10 and 11, respectively, conform to those of Figures 6 and 7 and are, therefore, interchangeable therewith. For identification, the panel in Figure 10 is denoted with the numeral 72, and that in Figure 11 with the numeral 73.

Inspection of Figure 10 reveals that certain of the printed wires or conductors are discontinuous and define gaps or blank spaces. In this specific illustration, six separate groups of conductors are provided, and these are designated, respectively, with the letters A through F. It will be noted that group A comprises three conductors, group B—4 conductors, group C—2 conductors, groups D through F, respectively—5, 7 and 4 conductors. Group A is separated from groups B and F by a space 74, groups B and F are separated by a gap 75, and groups D and E are similarly separated by a gap 76. Group C is also separated from the facing conductors of group E by a small gap or interruption 77.

The upper printed wire panel 73 is also equipped with a plurality of conductors that comprise groups G through L. Group G has 13 conductors, group H—7 conductors, and groups I through L, respectively, have five, twelve, seven and six conductors. The conductors of the various groups define gaps or spaces which, for identification, are denoted with the numerals 78 through 81.

If reference is made now to Figure 12, it will be apparent what type of basic circuit interconnections can be made by use of the panels 72 and 73. For convenience, the terminal block 40 has been omitted from the illustration of Figure 12, but it should be understood that a terminal block can be employed; and in the absence of a coded card, the circuit interconnections shown in Figure 12 will be provided therethrough. With this conductor configuration, the printed wires of groups G, H and I will all be connected to the conductors of group A on the panel 72. The conductors in group H, however, will also be connected with the conductors comprising group B on the panel 72. Group J of the upper panel connects with group B on the lower panel; group K on the upper panel connects with groups B, C and D of the lower panel; and group L connects with the printed wires of group E. This then is the basic circuit interconnection, and it may be modified in innumerable ways by utilizing a punch-coded card as heretofore described.

There are many instances where circuit interconnections of the type illustrated in Figure 12 are desired as, for example, control systems wherein certain voltages, load resistances, meters, transducers, signal sources, etc. are necessarily connected selectively with other groups of circuit conditions or circuit components. If even greater complexity is required in circuit interconnections, the printed wire panels may be equipped with conductors in various circuit configurations on both sides thereof, and the conductors on the opposite sides of any panel can be connected together directly therethrough using any of the feed-through methods well known in the printed circuit art. Modern automation processes afford an example of environments wherein such very complex interconnections may be required, for in connection therewith checking equipment, adjusting, testing programs, quality limits, etc. are all integral and necessary features thereof.

It will be apparent from the foregoing description that the conductors carried by the upper and lower panels may have various configurations, and may be oriented in different relations on the panels. For example, the conductors could be located so as to form any suitable acute angle with the longitudinal axis of the panel from angular coincidence therewith, to perpendicularity. It is also unnecessary that the conductors of the upper and lower panels be at right angles with respect to each other. The only requirement is that they have what might be termed an intersecting relation—that is, be so disposed with respect to each other that interconnection can be made therebetween at points where the conductors have the same coordinants.

It will also be apparent that the conductors need not be printed wires if that term is considered in the most extreme restricted sense. Moreover, the conductors that are interconnected through the metallic links or bridges 53 need not be elongated, but in certain instances could be point contacts at least along the facing surfaces of the panels. Such an arrangement would restrict the versatility of the circuit selector device unless such point contacts were interconnected so as to provide, in effect, continuous conductors either along the opposite sides of the panels or in circuitry remote therefrom.

While in the foregoing specification an embodiment of the invention has been disclosed in considerable detail for purposes of illustration, it will be apparent to those skilled in the art that numerous changes may be made in those details without departing from the spirit and principles of the invention.

I claim:

1. In a device of the character described, a pair of frame members, a pair of panels carried respectively by said frame members in spaced apart relation, each of said panels being provided with a plurality of conductors cooperatively oriented in a configuration that determines a basic interconnection therebetween, a contact block interposed between said panels and having a plurality of openings therethrough aligned respectively with the conductors of each of said panels, and a contact in each of said openings and having end portions projecting therethrough for engagement with the conductors of the respective panels, said contact block and one of said panels being adapted to receive an aperture-coded insulating card therebetween to separate the contacts from the conductors of that panel except where the card is apertured whereby such basic interconnection between said panels can be modified by such aperture-coded card, each contact being provided with a laterally bowed intermediate portion affording compression of the contact along the length thereof to accommodate interposition of said card between said block and one panel and to effect a resilient engagement of the contact with the conductors of the respective panels.

2. In a universal circuit selector device, a contact block provided with a plurality of passages extending therethrough and arranged in multiple longitudinally and multiple transversely extending rows, a panel equipped with conductors respectively aligned with the passages in said longitudinally extending rows and being oriented in juxtaposition with said block along one side thereof, a second panel equipped with a plurality of conductors adapted to be aligned respectively with the passages in said transversely extending rows, means for bringing said second panel into juxtaposition with said block along the other side thereof, and a contact positioned in each of said passages and having end portions respectively engageable with the conductors of said panels, said block and said second panel being arranged to receive an aperture-coded card therebetween to separate the adjacent ends of said contacts from the conductors of said second panel except where said card is apertured, each contact being provided with a laterally bowed intermediate portion affording compression of the contact along the length thereof to accommodate interposition of said card between said block and one panel and to effect a resilient engagement of the contact with the conductors of the respective panels.

3. The selector device of claim 2 in which the conductors provided by the respective panels are oriented in groups to determine a basic interconnection system therebetween.

4. In a circuit selector device, a contact block provided with a plurality of passages extending therethrough in multiple rows respectively extending in generally longitudinal and generally transverse directions, a panel equipped with a plurality of conductors respectively aligned with the multiple longitudinally extending rows of passages and being positioned in facing relation with said block along one side thereof, a second panel equipped with a plurality of conductors adapted to be aligned respectively with the multiple transversely extending rows of passages, means for bringing said second panel into facing relation with said block along the other side thereof to so align the conductors of said second panel with said multiple transversely extending rows of passages, and a plurality of generally U-shaped contacts respectively positioned in said passages and each of said contacts having laterally turned end portions extending outwardly from the passage therefor for engagement with the conductors of the respective panels, said block and said second panel being arranged to receive an aperture-coded card therebetween to separate the adjacent end portions of said contacts from the conductors of said second panel except where the card is apertured, each of said contacts being compressible to accommodate such card and to assure firm engagement of the contacts with the conductors of the respective panels.

5. In a circuit selector of the character described, a lower frame member, an upper frame member supported on said lower frame member for selective movement between open and closed positions, manually operable latch means for fastening said frame members in closed position, an insulating block carried by said lower frame member and being provided with a plurality of passages therethrough arranged in a multiplicity of transversely and longitudinally extending rows, a spring contact member in each of said passages and being dimensioned to have the ends project outwardly therefrom, a lower conductor-equipped panel mounted in said lower frame with the conductors thereof aligned respectively with the longitudinally extending rows of passages in said block for engagement with the lower ends of the contacts therein, and an upper conductor-equipped panel carried by said upper frame with the conductors thereof aligned with the respective transversely extending rows of passages in said block for engagement with the upper ends of the contacts therein, said upper and lower frames being adapted to have a punched card inserted therebetween in facing relation with said block to separate said contacts from the conductors of said upper panel except at the punched portions of the card aligned with the contacts, each of said passages being open at one end thereof to afford respective insertion of the contacts thereinto and having a closure wall at the opposite end thereof defining a restricted passageway therethrough, each of said contacts being generally U-shaped with laterally turned end portions one of which is slidably receivable in the passageway of the passage therefor, said spring contacts being compressible into the dimensional limits of the respectively associated passages and passageways.

6. In a circuit selector of the character described, a lower frame member, an upper frame member supported on said lower frame member for selective movement between open and closed positions, manually operable latch means for fastening said frame members in closed position, an insulating block carried by said lower frame member and being provided with a plurality of passages therethrough arranged in a multiplicity of transversely and longitudinally extending rows, a spring contact member in each of said passages and being dimensioned to have the ends project outwardly therefrom, a lower conductor-equipped panel mounted in said lower frame with the conductors thereof aligned respectively with the longitudinally extending rows of passages in said block for engagement with the lower ends of the contacts therein, and an upper conductor-equipped panel carried by said upper frame with the conductors thereof aligned with the respective transversely extending rows of passages in said block for engagement with the upper ends of the contacts therein, said upper and lower frames being adapted to have a punched card inserted therebetween in facing relation with said block to separate said contacts from the conductors of said upper panel except at the punched portions of the card aligned with the contacts, said upper and lower frames being provided with bores therein alignable when the frame members are closed, said spring biased pin being slidably mounted in the bore of said lower frame and extending therebeyond for longitudinal insertion into the bore of said upper frame member, said pin being operative to prevent inadvertent closure of said upper frame except when the projecting end of said pin is drawn into the bore of said lower frame.

7. In a circuit selector of the character described, a lower frame member, an upper frame member supported on said lower frame member for selective movement between open and closed positions, manually operable latch means for fastening said frame members in closed position, an insulating block carried by said lower frame member and being provided with a plurality of passages therethrough arranged in a multiplicity of transversely and longitudinally extending rows, a spring contact member in each of said passages and being dimensioned to have the ends project outwardly therefrom, a lower conductor-equipped panel mounted in said lower frame with the conductors thereof aligned respectively with the longitudinally extending rows of passages in said block for engagement with the lower ends of the contacts therein, and an upper conductor-equipped panel carried by said upper frame with the conductors thereof aligned with the respective transversely extending rows of passages in said block for engagement with the upper ends of the contacts therein, said upper and lower frames being adapted to have a punched card inserted therebetween in facing relation with said block to separate said contacts from the conductors of said upper panel except at the punched portions of the card aligned with the contacts, said latch means comprising a pair of latch pins respectively carried by said lower frame on opposite sides thereof and comprising also a pair of handle-equipped cam latches pivotally supported by said upper frame and being provided with cam slots therein for engagement with said latch pins to effectuate a closure of said frame members.

8. In a circuit selector device having a pair of frame members movable relative to each other between open and closed positions, a pair of panels respectively carried by said frame members and each panel being provided with a plurality of conductors defining a basic circuit interconnection between the panels in which at least certain of the conductors of each panel have substantially corresponding coordinates, an insulating block supported intermediate said panels and being provided with a plurality of passages therethrough at least certain of which are respectively alignable with such coordinates, and a plurality of spring contact members respectively positioned in said passages and being dimensioned to have the ends project outwardly therefrom for engagement with the conductors of the panels having coordinates respectively corresponding to those of the passages, said insulating block and one of said panels being arranged to have an aperture-coded insulating card inserted therebetween to separate said contact members from the conductors of said one panel except where the card is apertured so as to alter the basic interconnection defined by said conductors, each of said contact members being compressible along the longitudinal axis of the passage therefor to accommodate such card and assure firm engagement with the conductors of the respective panels, each of said contact members having a laterallv bowed intermediate portion providing the aforesaid compressibility.

9. In a circuit selector device, a pair of insulating panels adapted to have the adjacent faces thereof disposed in spaced apart, substantially parallel relation, each of said panels being equipped with a plurality of conductors oriented in patterns that define a basic circuit interconnection between the panels, an insulating block having opposite faces respectively disposed adjacent the aforesaid faces of said panels and being provided with a plurality of passages extending therethrough from face to face thereof, at least certain of the conductors of the respective panels having substantially identical coordinates respectively corresponding to the coordinates of said passages, said block and one of said panels being arranged to receive an aperture-coded insulating card therebetween to electrically isolate the two except at such apertures, and a plurality of contacts respectively positioned in said passages and having end portions adapted to project outwardly therefrom, each of said contacts being resilient and compressible along the longitudinal axis of the passage therefor to accommodate such card and to resiliently engage the conductors having identical coordinates where such card is apertured, each of said passages being open at one end thereof to accommodate insertion of a contact thereinto and having a closure wall at the opposite end thereof defining a restricted passageway therethrough, each of said contacts having a laterally bowed intermediate portion enabling the contact to be compressed substantially into the dimensional limits of the associated passage, one end of each contact being disposed within the passageway therefor.

10. A connector adapted for use in a circuit selector device to establish an electric connection between a pair of conductors respectively located in spaced apart relation, comprising a contact block adapted to be interposed between such conductors and being provided with at least one passage extending therethrough and alignable at the respective ends thereof with such conductors, and a unitary contact extending through said passage and having end portions adjacent the respective ends thereof for engagement with such conductors, said contact being provided with a resilient intermediate portion compressible longitudinally along said passage to accommodate selective interposition of an aperture-coded card between said contact block and one of said conductors or resilient frictional engagement of the end portions of the contact with the respective conductors, said resilient intermediate portion of said contact being laterally bowed and defining a generally U-shaped configuration.

11. A connector adapted for use in a circuit selector device to establish an electric connection between a pair of conductors respectively located in spaced apart relation, comprising a contact block adapted to be interposed between such conductors and being provided with at least one passage extending therethrough and alignable at the respective ends thereof with such conductors, and a unitary contact extending through said passage and having end portions adjacent the respective ends thereof for engagement with such conductors, said contact being provided with a resilient intermediate portion compressible longitudinally along said passage to accommodate selective interposition of an aperture-coded card between said contact block and one of said conductors or resilient frictional engagement of the end portions of the contact with the respective conductors, said intermediate portion of said contact being laterally bowed to provide the aforesaid longitudinal compressibility.

12. In a circuit selector device, a pair of conductor-equipped panels oriented in spaced apart relation, an insulating block having faces thereof respectively disposed adjacent said panels and being provided with a plurality of passages therein extending substantially from face to face thereof, the conductors of said panels being respectively disposed along said faces of said insulating block and at least one of said panels being provided with a plurality of electrically isolated conductor groups each comprising a plurality of separate conductors, a plurality of contacts respectively positioned in said passages and having end portions adapted to respectively engage the panel conductors aligned therewith, said block and one of said panels being adapted to receive an aperture-coded insulating card therebetween to electrically isolate the two except at such apertures so as to alter the basic circuit interconnection defined by said conductor-equipped panels.

13. The circuit selector device of claim 12 in which the aforesaid faces of said insulating block are disposed in spaced apart and substantially parallel relation and in which said passages are arranged in longitudinally extending and transversely extending rows, the conductors of one of said panels extending generally in longitudinal directions and the conductors of the other of said panels extending generally in transverse directions whereby said contacts are adapted to respectively engage said conductors where the coordinates of the conductors coincide with the coordinates of said contacts.

14. In a circuit selector device, a pair of frame members selectively movable relative to each other between open and closed positions, a pair of conductor-equipped panels respectively carried by said frame members and being oriented thereby in a position of spaced apart parallelism when said frame members are in the closed position thereof, an insulating block carried by one of said frame members and having spaced apart and substantially parallel faces adapted to be disposed in respective adjacency with said panels when said frame members are closed and said block being provided with a plurality of passages therein extending substantially from face to face thereof, and a plurality of contacts respectively positioned in said passages and having end portions adapted to respectively engage the panel conductors aligned therewith when said frame members are in their closed position, said block and one of said panels being adapted to receive an aperture-coded insulating card therebetween to electrically isolate the two except at such apertures so as to alter the basic circuit interconnection defined by said conductor-equipped panels, at least one of said panels being releasably and removably carried by the associated frame member so as to permit ready interchange of such one panel for another to alter the basic circuit interconnection defined by any pair of panels carried at any time by said frame members.

15. The circuit selector device of claim 14 in which at least one of said panels is provided with a plurality of electrically isolated conductor groups each comprising a plurality of separate conductors.

References Cited in the file of this patent

UNITED STATES PATENTS

| | | |
|---|---|---|
| 2,198,503 | Morrison | Apr. 23, 1940 |
| 2,274,071 | Kelly | Feb. 24, 1942 |
| 2,478,274 | Johnson | Aug. 9, 1949 |
| 2,586,854 | Myers | Feb. 26, 1952 |
| 2,613,287 | Geiger | Oct. 7, 1952 |
| 2,695,379 | Myers | Nov. 23, 1954 |
| 2,701,346 | Powell | Feb. 1, 1955 |
| 2,724,026 | Johnson | Nov. 15, 1955 |
| 2,744,172 | Porter | May 1, 1956 |
| 2,771,523 | Stoecklin | Nov. 20, 1956 |
| 2,817,824 | Albright | Dec. 24, 1957 |

FOREIGN PATENTS

| | | |
|---|---|---|
| 424,714 | Italy | Aug. 1947 |

OTHER REFERENCES

Electronic Design, vol. 3., pp. 46–47, June 1955.

Radio and TV News, pp. 42 and 180, September 1956.